Nov. 7, 1950           E. SCHULZ           2,528,556

OVERFLOW PIPE AND VALVE FOR FLUSH TANKS

Filed May 20, 1946           2 Sheets-Sheet 1

INVENTOR.
EDWARD SCHULZ
BY Joseph A. Rave
Attorney

Nov. 7, 1950        E. SCHULZ        2,528,556
OVERFLOW PIPE AND VALVE FOR FLUSH TANKS
Filed May 20, 1946        2 Sheets-Sheet 2
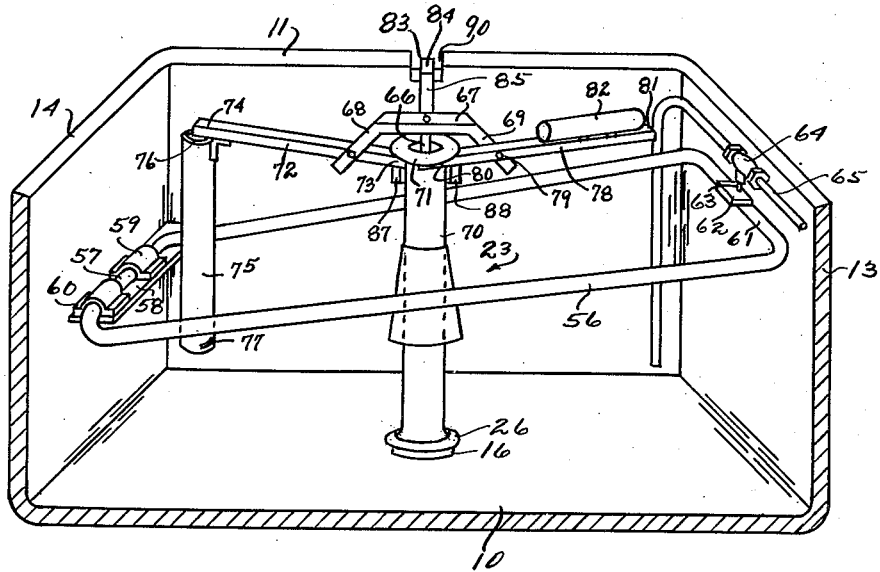
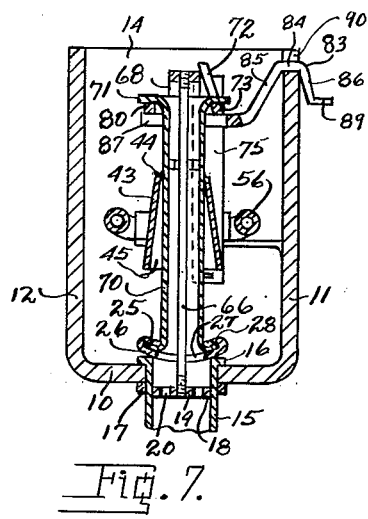
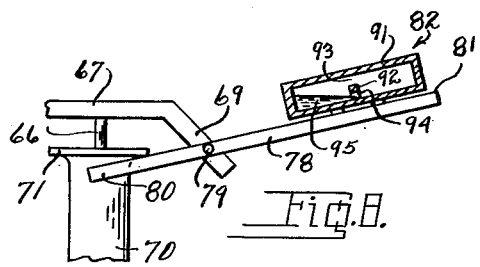
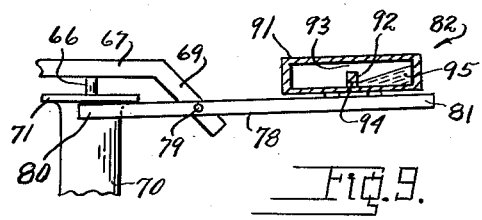
INVENTOR.
EDWARD SCHULZ
BY
*Joseph A. Rave*
Attorney Patented Nov. 7, 1950

2,528,556

UNITED STATES PATENT OFFICE 2,528,556

OVERFLOW PIPE AND VALVE FOR FLUSH TANKS

Edward Schulz, Aurora, Ind.

Application May 20, 1946, Serial No. 670,912

2 Claims. (Cl. 4—58)

This invention relates to improvements in toilet reservoir tanks and particularly to improvements in the means for releasing the water from said tanks.

An object of this invention is the provision of a device that will permit of the complete emptying of said tank, thereby eliminating the necessity of bailing the tank in the event it is in a place where there is danger of freezing.

Another object of this invention is the provision of a tank that is reduced to a minimum in size yet will contain an adequate amount of flush water.

Another object of this invention is the provision of a simple construction that requires a minimum of service and in which repairs can be readily made.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 6 is a perspective view similar to Figure 1 illustrating a modification in the mechanism.

Figure 7 is a transverse sectional view of the tank of Figure 6.

Figure 8 is an enlarged view of certain parts of the mechanism which form a detail of the invention.

Figure 9 is a view similar to Figure 8 showing the parts in a second position of adjustment.

Throughout the several views of the drawings similar reference characters denote the same or similar parts.

Figure 1:
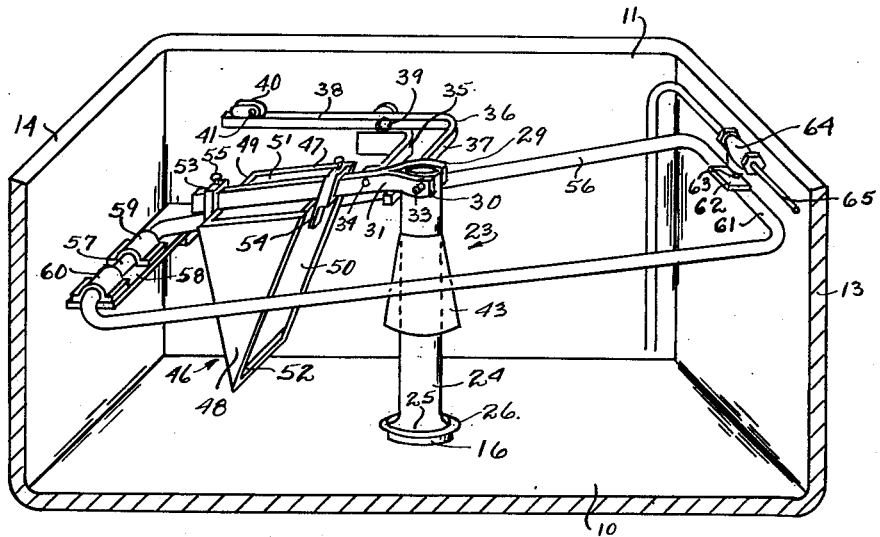
Figure 1 is a perspective view of a flush tank embodying the improvements of this invention.

The device of this invention comprises a tank or reservoir having a bottom 10 from which rises the front 11, back 12, and opposite sides 13 and 14. Substantially, centrally of the bottom 10 depends the flush or drain pipe 15 having at one end radial flange 16 which engages the upper surface of the bottom 10 around the opening therein through which the flush or drain pipe 15 passes. The said flush or drain pipe is held in place by a clamp nut 17, threaded on said pipe against the lower side of the bottom 10.

Figure 2:
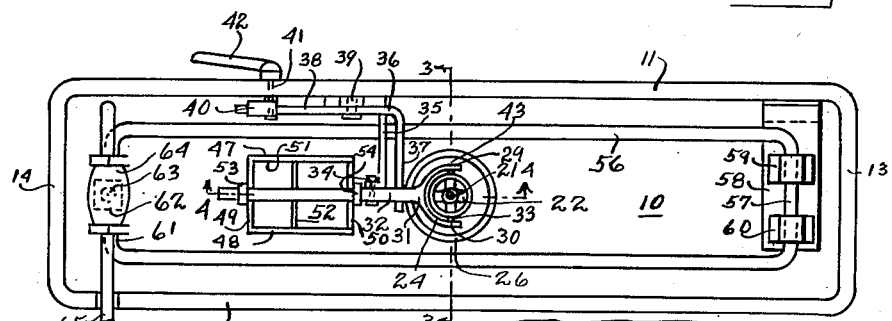
Figure 2 is a top plan view of the tank of Figure 1.
Figures 3, 4, 5:
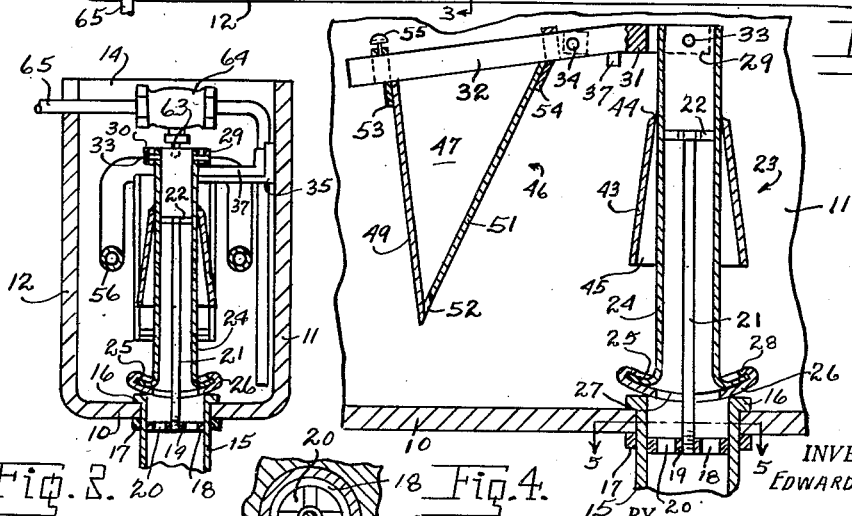
Figure 3 is a transverse cross-sectional view of the tank taken on line 3—3 on Figure 2.
Figure 4 is an enlarged fragmentary cross-sectional view of certain parts of the device taken on line 4—4 on Figure 2.
Figure 5 is a cross-sectional view taken on line 5—5 on Figure 4.

Threaded into the drain or flush pipe 15 just below its open end is a spider 18 having a central boss 19 with openings 20 therearound between said boss 19 and the outer screw thread carrying ring. Threaded into the boss 19 and upstanding therefrom is a rod 21, which may be solid or hollow, which has at its upper end outwardly projecting arms 22, see Figure 2. The rod 21, with its arms 22, forms a centralizing guide for the combined overflow pipe and flush tank valve indicated in general by the reference numeral 23; the guiding action takes place between the outer edges of the radial arms 22 and inner surface of the overflow pipe.

Specifically, the overflow pipe and flush tank valve comprises a length of pipe or tube 24 open at both ends. The lower end of said tube 24 is formed to provide an outwardly and upwardly flaring flange 25 providing an outer rounded surface on the flange. In practice this flange cooperates with the upper corner or edge of the drain or flush pipe bore to act as a valve for closing off flow through said pipe. The valve proper is formed by a relatively soft replaceable valve member 26, preferably made of a sheet of resilient soft rubber having a central opening 27, corresponding to the bore through the overflow pipe 24, and held in place by having its free edge drawn over the flange 25 as illustrated at 28. By this construction the closing of the opening through the drain pipe 15 is effected by impinging the valve member 26 between the overflow pipe flange 25 and inner corner of the drain pipe, except as such flow may be necessary or occasioned by flow through the overflow pipe.

In order to unseat the valve 26 the upper end of the overflow pipe 24 is received between and pivotly connected to the fingers 29 and 30 of forked end 31 of a bar 32 by means of a pivot or pivots 33. The bar 32 is pivoted intermediate its ends at 34 to a bracket 35 carried by and extending into the tank from either its front or back, shown in the drawing as extending from the front 11. The bar 32 is actuated about its pivot 34 by an L-shaped lever 36, which has its one arm 37 underlying the bar 32, at a point between its forked end 31 and pivot 34, and its other arm 38 pivoted at 39 to the bracket 35, The lever 36 may be actuated about its pivot in any suitable or desirable manner which as shown in the drawing in Figures 1 and 2 may take the form of a cam 40 fixed to the inner end of a shaft 41 passing through the front wall 11 and projecting to receive a handle 42. The cam 40 rests on the upper surface of the lever arm 38 whereby counter-clockwise movement thereof, as seen in Figure 1, causes a similar movement of the lever 36 to raise the overflow tube and flush valve.

As is usual in the operation of flush tank valves, the handle 42 is released almost immediately but the valve remains open because of a floating action thereof as well as because of a counterbalancing thereof which permits only a slow closing of the valve.

The floating of the combined overflow pipe and flush valve is effected through the buoyancy given it by the inverted funnel shaped member 43 which has its small end of substantially the same size as that of the overflow pipe and soldered, brazed or otherwise secured to one another as indicated at 44. It is believed this floating action is obvious from the drawing since the water rises slowly inside the tank and will trap the air in the float member 43 by closing or sealing the large open end 45 thereof, thereby giving to the overflow pipe and flush valve unit 23 a displacement volume greater than its weight.

The overflow pipe and flush valve unit 23 is counterbalanced and caused to slowly close, thereby permitting the complete discharge of the tank. This counterbalancing is effected by a bucket indicated in general by the reference character 46, mounted on the bar 32 on the opposite side of the pivot 34 from that to which the overflow pipe is pivotally connected. The bucket 46 comprises two opposed sides 47 and 48 which are of equal area although triangularly shaped and two additional sides 49 and 50 which join the opposed edges of the sides 47 and 48. The top of the bucket 46 is completely open as at 51 while the bottom is provided with a restricted opening 52, illustrated in the drawings as a narrow slit for the full width of the bucket. The bucket is attached to the bar 32 through straps or brackets 53 and 54 extending respectively from sides 49 and 50 whereby they may be adjusted toward and from pivot 34. The bucket is secured in adjusted positions by a clamp screw 55 in the bracket 53.

The operation of the counterbalancing mechanism is as follows:

As the water recedes from the tank after the valve member 26 has been raised and the water level reaches the point where the buoyancy of the overflow pipe and flush valve unit 23 has a tendency to follow the water level the said unit is held in its raised position by the bucket due to the water therein which does not flow from the slit 52 at the rate of water flow through the drain pipe 15. The rate of flow from the bucket 46 is such that the flush tank is empty at the time sufficient water has flowed from the bucket so that the overflow pipe and flush valve unit 23 can descend by gravity to a closed position. When the valve 26 closes the water again rises in the tank to its normal level, thereby filling the bucket 46 without unseating the flush valve.

A novel float is disclosed in this application for opening and closing the water inlet valve. The float consists of a rectangular frame 56 of hollow tubing and formed of buoyant material and preferably non-corrodible, such for example as plastic. The frame 56 has preferably a round cross-section and particularly so at one of its short sides, such as 57, which is conveniently used as a means for hingedly mounting the frame for oscillation within the tank. Accordingly, a ledge 58 is provided which projects from the tank front or back into the tank on which is mounted bearings 59 and 60 in which is journaled the said short side 57 of the floating frame 56. The opposite short side 61 of the frame is provided with an abutment 62 to engage spring biased valve plunger 63 of water shut off valve 64. The water shut off valve 64 is in the water supply pipe 65 as is usual practice.

The operation of the float frame is believed obvious, since as the water rises toward its normal height within the tank it raises the free end, or short side 61, thereof, to the point where its abutment 62 engages and closes off the valve 64.

From the foregoing it will be noted that there has been provided a flush tank that is arranged to be of a minimum width due to the elimination of the usual float ball and the centrally mounted operating parts. It should be noted that all of the parts are formed of non-corrodible materials and may be conveniently similar to the floating frame 56, formed of the so called plastic materials.

The modification illustrated in Figures 6 to 9, inclusive, accomplishes the same results as the mechanisms above described with, however, a slightly different method of mounting the parts. In this modification the upstanding rod 66, which takes the place of rod 21, carries substantially all of flush valve operating parts. Accordingly, this rod 66 has its upper end threaded to receive cross head 67 which has laterally projecting arms 68 and 69. The overflow pipe or tube 70 is modified over the corresponding tube 24 of Figures 1 to 5, inclusive, to the extent that the upper end thereof is flared to provide a flange 71. It is through the medium of this flange 71 that the flush valve operating and counterbalancing means is connected with the overflow pipe and flush valve unit.

The counterbalancing means is illustrated in the modification as of a dual nature although each may be used separately and independently. The first counterbalancing means is similar to that above described, comprising a lever 72 pivoted intermediate its ends to the crosshead arm 68 and which lever has one end 73 under the overflow pipe flange 71 and the other end 74 carries a counterbalance weight 75. The counterbalance weight 75 is illustrated in Figure 6 as a cylinder having its upper end open as at 76 and its lower end closed with a restricted opening 77 just above the bottom. The second counterbalance means comprises a lever 78 pivoted intermediate its ends at 79 to the crosshead arm 69 and has its inner end 80 disposed beneath the overflow tube flange 71 and the other end 81 carries a counterbalance weight 82.

The flush valve unseating means comprises a generally U-shaped member indicated in general by the reference numeral 83 which includes a base member 84 having arms 85 and 86 which diverge from one another at slight angles. The arm 85 terminates in an outwardly projecting fork whose fingers 87 and 88 straddle the overflow tube or pipe and underlie the inner ends 73 and 80, respectively, of levers 72 and 78. The other arm 86 of the U-shaped member is provided with a finger piece 89 through which the member 83 is operated.

The operation of the valve unseating means is as follows:

The tank front 11 is provided with a depression 90 to receive the U-shaped member base 84 and the parts are then in the positions illustrated in Figure 7. It will be noted that the arm 86 projects at an angle outwardly of said tank front wherefore pressure on the finger piece 89 will oscillate the ember 83, utilizing its base 84 as a fulcrum, and thereby elevate the forked end and parts carried on its fingers.

The elevating of the overflow pipe 70 and unseating of the valve 26 causes this unit to float through the action of the float member 43 as described above. The reseating of the valve 26 is controlled in part by the counterbalance 75 which operates in substantially the same manner as the bucket mechanism 46 above.

The construction and operation of the counterbalance weight 82 is as follows:

Use is made of a sealed cylinder 91 having substantially midway of its length a transverse partition 92 that extends into the cylinder a distance to leave considerable space 93 between its upper edge and the opposed portion of the cylinder and said partition having at its lowest point a restricted opening 94. Within the cylinder 91 is a quantity of liquid 95, such for example as mercury. The quantity is such that it is contained in the space between the partition 92 and end of cylinder, see Figure 8. In use, the operation of the member 83 in raising the overflow pipe and flush valve simultaneously raises the inner end 80 of lever 78 from the position shown in Figures 6 and 8 to the position shown in Figure 9. This action is a rather abrupt one and shifts the liquid 95 from the side of the partition 92, where it is normally disposed, over said partition through the space 93 to the other side of the partition 92, see Figure 9. The force acting on the lever 78 with the liquid in the position of Figure 9 is much greater than with the liquid in the position of Figure 8 and is sufficient to hold the overflow pipe and flush valve open until the tank has been drained. During the draining of the tank the liquid 95 is slowly returning through the restricted opening 94 to its normal side of the partition 92 thereby lowering the force acting on the lever 78 so that the overflow pipe and flush valve unit returns to the valve closing position by gravity as above described. This action of the overflow pipe and flush valve returns the levers 72 and 78 to their normal positions in Figures 6 and 8 and returns the member 83 to its normal position in Figure 7 ready for subsequent use.

What is claimed is:

1. As an article of manufacture a combined overflow pipe and flush valve comprising a tube having an outwardly projecting flange at the valve end of the tube, a replaceable valve member on said tube flange in the form of a compressible disc underlying said flange and having a central aperture aligned with the opening in the tube and said disc having portions thereof beyond the flange drawn over the flange to retain the disc in position, means carried by the tube intermediate its ends to cause a floating of the tube, and means at the other end of the tube, whereby, it may be connected to valve unseating means.

2. As an article of manufacture a combined overflow pipe and flush valve comprising a tube, an outwardly projecting flange at the valve end of the tube, a replaceable valve member on said tube flange in the form of a compressible disc underlying said flange and having a central aperture aligned with the opening in the tube and said disc having portions thereof beyond the flange drawn over the flange to retain the disc in position, means carried by the tube intermediate its ends to cause a floating of the tube, and an outwardly projecting flange at the other end of the tube adapted to be connected to means for unseating the valve member.

EDWARD SCHULZ.

REFERENCES CITED

The following references are of record in the file of this patent:

UNITED STATES PATENTS

| Number | Name | Date |
|---|---|---|
| 413,590 | White | Oct. 22, 1889 |
| 443,845 | Blessing | Dec. 30, 1890 |
| 564,338 | Powell | July 21, 1896 |
| 1,526,738 | Brady | Feb. 17, 1925 |
| 2,077,832 | Gebert | Apr. 20, 1937 |

FOREIGN PATENTS

| Number | Country | Date |
|---|---|---|
| 241,504 | Germany | Dec. 4, 1911 |